Patented May 21, 1935

UNITED STATES PATENT OFFICE 2,002,247

ANTHRAQUINONE DERIVATIVE AND PROCESS OF MAKING THE SAME

Wilhelm Moser, Riehen, near Basel, and Walter Fioroni, Binningen, near Basel, Switzerland, assignors to firm of Society of Chemical Industry in Basle, Basel, Switzerland No Drawing. Application February 25, 1935, Serial No. 8,216. In Switzerland February 27, 1934

2 Claims. (Cl. 260—60)

It has been found that a new antraquinone derivative, the 2-amino-1,1'-dianthraquinonyl of the formula

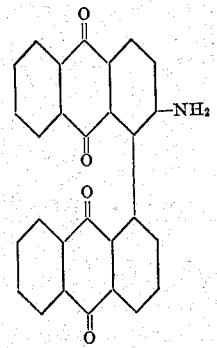

can be obtained if approximately equimolecular proportions of a 1-halogen-2-acylaminoanthraquinone and of a 1-halogen-anthraquinone are subjected to a treatment with dehalogenating agents, such as, for example, copper powder, and treating the products thus obtained with saponifying agents. This treatment is carried out in the heat, advantageously in presence of a diluent, such as, for example, naphthalene. The 2-acylamino-1,1'-dianthraquinonyls which are obtained as intermediate products are yellow crystalline powders which dissolve in cold sulfuric acid to a yellow solution and yield with sodium hyposulfite and dilute sodium hydroxide solution brown to brown-red vats.

The 2-amino-1,1'-dianthraquinonyl obtained from the acylamino derivative by saponification forms orange crystals insoluble in water, but dissolving in sulfuric acid to an orange solution and in alkaline hydrosulfite solution to a red-brown solution. The 2-amino-1,1'-dianthraquinonyl and the acyl-derivatives thereof are valuable intermediate products for the manufacture of dyestuffs.

The following example illustrates the invention, the parts being by weight:—

65 parts of naphthalene are heated to 200° C. and to this there is added a mixture consisting of 39 parts of 1-chloro-2-phthalimino-anthraquinone (obtained according to German patent 559,332), 24 parts of 1-chloro-anthraquinone and 39 parts of very pure finely divided copper. The whole is boiled for 24 hours in a reflux apparatus. It is then diluted with little chlorobenzene, filtered by suction while hot, and washed with chlorobenzene. The 2-phthalimido-1,1'-dianthraquinonyl thus obtained can be purified by boiling it out with dilute nitric acid or by recrystallization from nitrobenzene. These two steps can also be combined. Into a mixture of 150 parts of pyridine and 5 parts of hydrazine hydrate there are now introduced 10 parts of 2-phthalimino-1,1'-dianthraquinonyl, the whole is heated to 25° C., stirred for 4 hours at 25–30° C., filtered by suction, washed neutral with hot water, and dried.

What we claim is:—

1. Process for the manufacture of an antraquinone-derivative, the 2-amino-1,1'-dianthraquinonyl, consisting in subjecting an approximately equimolecular mixture of a 1-halogen-2-acylamino-anthraquinone and of a 1-halogen-anthraquinone to a treatment with dehalogenating agents, and saponifying the products thus obtained.

2. The 2-amino-1,1'-dianthraquinonyl of the formula

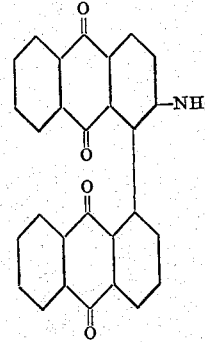

which forms orange colored crystals insoluble in water, but soluble in sulfuric acid to an orange solution and in alkaline hydrosulfite solution to a red-brown solution.

WILHELM MOSER.
WALTER FIORONI.